May 20, 1958 G. E. SMITHBURN 2,835,182
GARDEN CULTIVATOR
Filed April 28, 1954 3 Sheets-Sheet 1
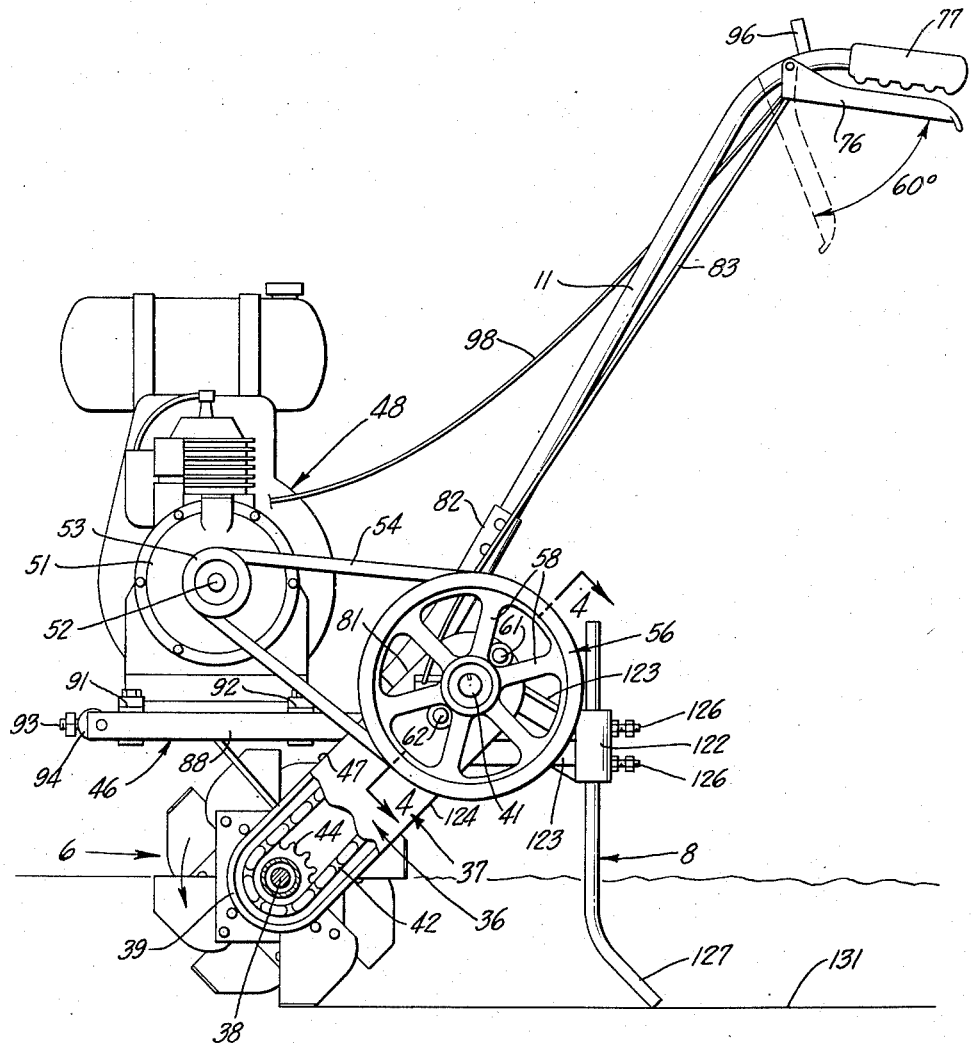
FIG_1_
INVENTOR.
George E. Smithburn
BY Manfred M Warren
His Attorney May 20, 1958  G. E. SMITHBURN  2,835,182
GARDEN CULTIVATOR
Filed April 28, 1954  3 Sheets-Sheet 2
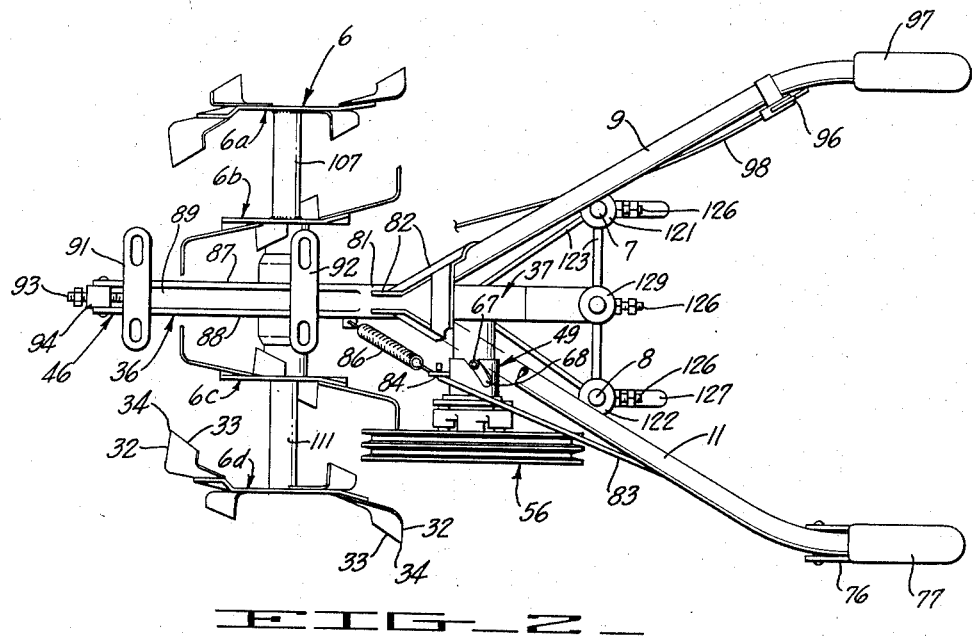
FIG_2
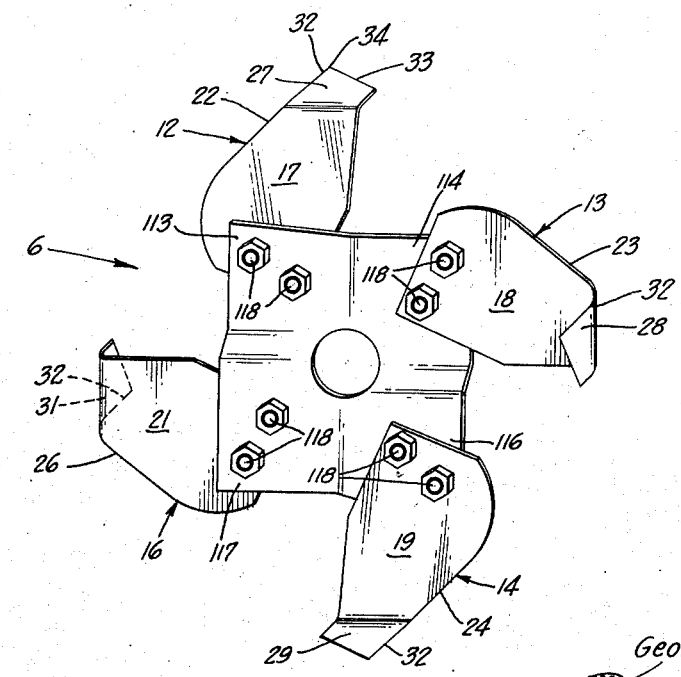
FIG_5
INVENTOR.
George E. Smithburn
BY Manfred T. Warren
His Attorney.

May 20, 1958  G. E. SMITHBURN  2,835,182
GARDEN CULTIVATOR
Filed April 28, 1954  3 Sheets-Sheet 3
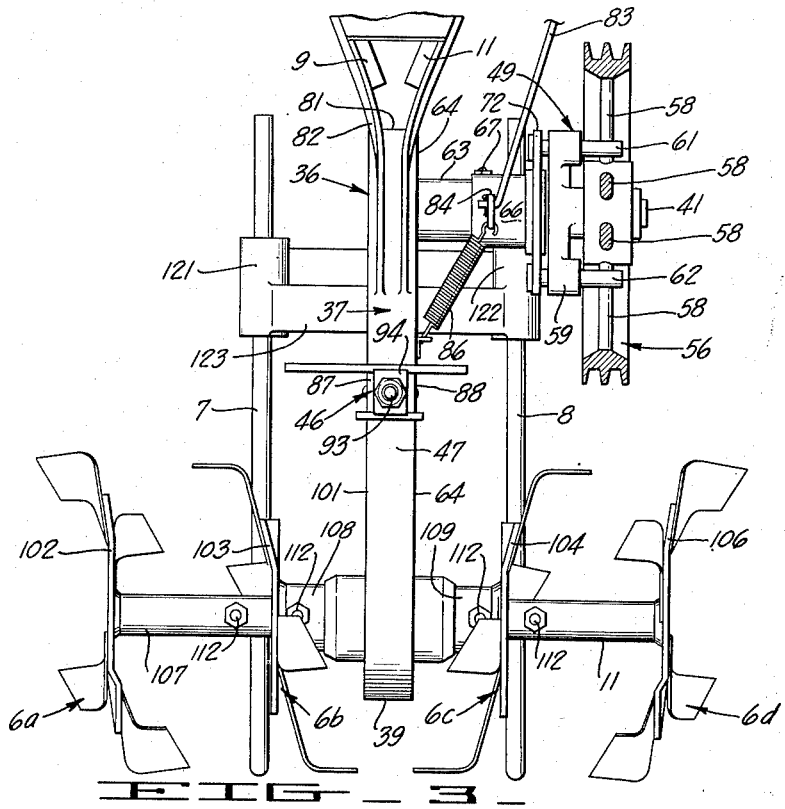
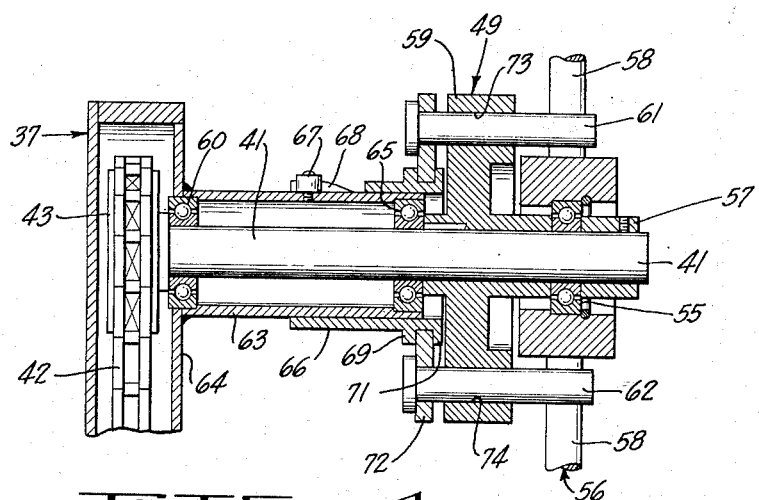
INVENTOR.
George E. Smithburn
BY
His Attorney

United States Patent Office 2,835,182
Patented May 20, 1958

2,835,182

GARDEN CULTIVATOR

George E. Smithburn, Berkeley, Calif.

Application April 28, 1954, Serial No. 426,079

4 Claims. (Cl. 97—40)

The invention relates to rotary tillage equipment and more particularly to garden tractors of the small portable walking type.

An object of the present invention is to provide a garden cultivator of the character described which is very efficient in its operation and will work well in the hardest of soils with reserve power, while at the same time giving a very good and improved tilling action in all types of soils with which the cultivator may be used.

Another object of the present invention is to provide a cultivator of the character above which is easy to learn to use, and to use, handle, turn, guide and otherwise direct and manipulate in and around and over garden beds, trees, shrubs, and the like with minimum physical effort.

Still another object of the present invention is to provide a garden cultivator of the character described in which the tilling action may be simply and readily controlled so as to provide a full range from a relatively slow spading action on the one hand, to a fine seed bed consistency on the other, and also wherein both the width and depth of tillage may be likewise easily controlled.

Yet a further object of the present invention is to provide a garden cultivator of the character above which is constructed of a minimum number of sturdily formed parts which are designed to give very long and trouble-free service.

The invention has other objects and features of advantage, some of which, with the foregoing, will be set forth in the following description of the preferred form of the invention which is illustrated in the drawings accompanying and forming part of the specification. It is to be understood, however, that variations in the showing made by said drawings and description may be adopted within the scope of the invention as set forth in the claims.

Referring to said drawings (3 sheets):

Figure 1 is a side elevation of a garden cultivator constructed in accordance with the present invention, portions of the machine being broken away and shown in section.

Figure 2 is a plan view of the cultivator with the engine removed and portions broken away for clarity of illustration.

Figure 3 is a fragmentary front elevation of the cultivator with the engine removed, and with portions broken away and shown in section.

Figure 4 is a fragmentary cross-sectional view taken substantially on the plane of line 4—4 of Figure 1.

Figure 5 is a perspective view on an enlarged scale of one of the mills forming part of the cultivator.

The cultivator of the present invention, as illustrated in the accompanying drawings, consists briefly of a rotary power-driven ground-engaging mill 6 which cooperates with one or more rearwardly disposed ground-engaging brake members 7 and 8 to provide the sole support of the cultivator on the ground, with the majority of the weight of the cultivator carried by the mill 6, the brake members 7 and 8 functioning to resist the forward travel of the mill over the ground to be tilled to thereby control the tilling action. Rearwardly disposed handles 9 and 11 provide means for directing the forward travel of the cultivator and, as will be seen from the drawings, these handles are arranged generally over the brake members 7 and 8 so that the operator may readily control the downward pressure on the brake members and thus the forward progress of the machine and the character of the tilling action produced.

As a particularly important feature of the present invention, the mill 6 is made up of a plurality of plate-like tines 12, 13, 14 and 16 (see Figure 5) set in circumferentially spaced relation around the axis of rotation of the mill with their flat blade-like body portions 17, 18, 19 and 21 disposed in the plane of rotation of the mill, that is, perpendicular to the axis of the mill. Cooperating with this positioning, the tines are formed with relatively forwardly extending leading edges 22, 23, 24 and 26 serving to cleave and enter the ground in the plane of rotation, and radially outer trailing end portions 27, 28, 29 and 31 offset from the plane of the body portions so as to cut into and till the ground transversely of the plane of cleavage effected by the body portion. The forwardly extending leading edge of each of the tines may be defined by a forwardly jutting portion which strikes the earth and leads the entry of the body portion into the ground in sort of a progressive slicing action. The outer offset end portion of each of the tines is desirably bent at substantially right angles to the plane of the body portion and arranged with a sharpened leading edge 32 which, when viewed in the plane of rotation of the body as illustrated in Figure 2, is inclined to such plane so as to provide a progressively trailing entry of the offset tip into the ground. Each of the offset tips is preferably formed with a trailing edge 33 which meets the leading edge 32 in a fairly well defined point 34 at the distal end of the tip. As will be understood from the above, the forwardly extending leading edges of the tines will first strike the ground with a cleaving action in advance of the offset ends or hook portions, which then follow through with a hoe-like action after the ground is split.

The various parts of the cultivator are unitarily assembled on a frame 36, which includes as a portion thereof an elongated generally vertically set chain case 37. The tiller shaft 38, which supports the mill 6, is carried at the lower end 39 of the case and extends horizontally therefrom for support of the mill. A drive shaft 41 is carried at the upper end of the case and is connected within the case to the tiller shaft by means of a chain 42 which is entrained around sprocket wheels 43 and 44 mounted on the drive shaft 41 and the tiller shaft 38, respectively. Supported on a motor mounting bracket 46 extending horizontally and forwardly from the upper side 47 of the chain case is a gasoline engine 48 which is used to power the cultivator.

In accordance with the present invention substantial speed reducing means is interposed between the engine 48 and the tiller shaft for delivering increased torque from the engine to the mill. Preferably this speed reduction is in the order of between 25 and 30 to 1. As a feature of the present construction this speed reduction is taken substantially entirely between the engine and the drive shaft 41 and a manually controlled clutch 49 is interposed at this point of the drive train for selectively connecting and disconnecting the power to the drive shaft and permitting, when disconnected, the rolling of the mill over the ground without requiring a reverse driving of the speed reducing means.

Preferably the gasoline engine 48 is of the type having a built-in speed reduction transmission 51 ahead of the motor shaft 52. Gasoline engines such as the Lauson RSH, Clinton 700, and Briggs and Stratton No. 6 all provide this construction and are entirely satisfactory for present purposes. As here shown, a double belt sheave 53 is mounted on the engine shaft 52 and is connected by a pair of V-belts 54 to a double belt sheave 56 of substantially larger diameter, here mounted for free rotation on a bearing 55 carried by the drive shaft 41 and retained thereon by a fixed end sleeve 57 forming a shoulder on the outer end of the shaft. As will be seen from the drawings, the sheave 56 is formed with wheel spokes 58, and a clutch member 59 is keyed to the shaft 41 adjacent to the inside face of the sheave 56 and is provided with a pair of reciprocating pins 61 and 62 which are manually advanceable into and retractable out of engagement with the spokes 58 so as to connect and disconnect the drive shaft 41 and sheave 56.

Further details of construction of the clutch mechanism include a bearing sleeve 63 which is secured at one end to one side 64 of the chain case and projects horizontally therefrom and carries bearings 60 and 65 which support and journal for rotation the shaft 41. A collar 66 is mounted for rotation on the outside surface of the sleeve 63 and is reciprocated in an axial direction on the sleeve 63 by means of a pin 67 which projects outwardly from the sleeve 63 and carries a roller for engagement in a spirally cut slot 68 in the collar 66. The collar 66 is provided adjacent its outer end with a pair of spaced parallel flanges 69 and 71 which support for rotation therebetween a washer-like spider plate 72. The latter carries the outwardly projecting pins or dogs 61 and 62 which are supported in and project through bores 73 and 74 provided in the clutch member 59.

Rotation of the clutch collar 66 so as to control its axial reciprocation on the bearing sleeve 63 and the extension of the clutch pins 61 and 62 into and out of engagement with the wheel spokes 58, is here manually controlled from a hand grip lever 76 mounted adjacent the outer hand grip end 77 of a lefthand handlebar providing the handle 11. Preferably a pair of handlebars 9 and 11 are used to direct the forward travel of the cultivator, and as here shown these two handlebars are supported from the upper end 81 of the chain case 37 in an outwardly diverging V by means of a mounting bracket 82. The hand engaging lever 76 is here connected by a rod 83 to an outstanding arm 84 on the collar 66. Normally the collar 66 is maintained in a rotated position corresponding to the retracted open position of the clutch by means of a helical spring 86 connected between the arm 84 and the frame. This position of the collar corresponds with the open position of lever 76 and upon manual grasping of this lever and the hand grip 77 and squeezing the two together, the lever will be rotated to rotate the collar 66 to its advanced position wherein the clutch pins 61 and 62 project through the clutch member 59 and into engagement with the wheel spokes 58.

The high multiplication of torque between the gasoline engine 48 and the drive shaft 41 of the character above noted makes possible the use of a simple positive foolproof and durable type clutch mechanism of the character described. Preferably the speed reduction within the gear case is held to a minimum. I have found that a reduction of about 13 to 9 is about right. Where such a minor reduction is used, the cultivator may be readily rolled over the ground when the engine is turned off and the clutch opened. This is very valuable and convenient from a user's standpoint.

Preferably means is provided for adjusting the fore and aft positioning of the gasoline engine 48 so as to control the tension of belts 54 and also to control the distribution of the weight of the engine over the mill and brake members. As will be seen in the drawings, the motor mount 46 consists of a pair of horizontally disposed guide rails 87 and 88 and which carry therebetween a slide 89 provided with a pair of horizontally extending arms 91 and 92 which provide the bed plate for and are bolted to the base of the engine 48. A bolt 93 connecting the outer end of the slide with a spacer 94 mounted across the outer ends of the rails 87 and 88 provides for a longitudinal adjustment of the slide along the rails and correspondingly a fore and aft adjustment of the position of the engine. As will be seen from the drawings, the motor mount is disposed generally over but slightly forwardly of the center of the mill so as to locate the center of gravity of the cultivator as a whole substantially over the mill whereby the latter will support the majority of the weight of the cultivator. Further forward movement of the engine has the effect of decreasing the amount of weight normally applied to the brake members 7 and 8. The provision of the individual slide and its engine mounting arms makes the unit readily adaptable for use with various different makes of engines by simply selecting a slide designed for the engine to be used.

Preferably a second hand engaging lever 96 is provided at the outer hand grip end 97 of the right handlebar 9 and is connected by a cable 98 to the butterfly valve of the carburetor (not shown) of the engine so that the operator may readily and conveniently control the speed and power output of the engine.

As a feature of the present invention the tiller shaft 38 projects from the opposite sides 64 and 101 of the chain case adjacent the lower end 39 thereof and a plurality of ground tilling mills 6a, 6b, 6c and 6d of the character above described are mounted thereon with two of the mills 6a and 6b located on one side of the chain case and two of the mills 6c and 6d, located on the other side of the chain case. The several mills are each composed of a rectangular mounting plate 102, 103, 104 and 106, which are secured centrally thereof to sleeves or hubs 107, 108, 109 and 111, fastened to the tiller shaft 38 by shear bolts 112. The plate-like tine members above described may be conveniently secured to the corner portions 113, 114, 116 and 117 of each of the mounting plates so as to extend generally radially outwardly therefrom with respect to the tiller shaft. As here shown the flat blade-like body portions of each of the tines may be fastened as by bolts 118 to the corner portions of the mounting plates and preferably two of the four tines on each plate are turned so that their offset end portions face in one axial direction, while the other two tines are mounted in a reverse fashion and on an opposite side of the mounting plate, so that their offset end portions face in the opposite axial direction. In this manner the hoe portions of the tines will till the ground on opposite sides of the split in the earth produced by the leading edge of the body portion of the tines. Preferably and in accordance with the present invention, the spading action of each of the mills is further widened out by bending a pair of the corners 113 and 116 into an inclined position with respect to the plane of rotation of the mounting members so as to extend the reach of the tines 12 and 14 mounted on these corners. Also, as will be noted, tines 12 and 14 are faced in opposite axial directions so that a maximum overall width of tillage is obtained for each of the mills. I have found that a good design is to have each tine till approximately 1½ inches in width. The two tines 13 and 16 which are mounted in the plane of rotation of the mounting plate will thus mill a center section of about 3 inches. The bending of corner portions 113 and 116 extends the reach of each of tines 12 and 14 approximately an additional 1½ inches, thereby producing a 6 inch overall tilling width for each mill.

The construction and arrangement of the several ground tilling mills and their tines as above described produces in the operation of the machine a very important side to side reciprocation of the tiller during its forward travel. The effects of this side to side reciprocation are several. Firstly, it is sufficient, being of an amplitude of at least 2 inches, to cut away completely and till the center section of ground directly under the chain case. Secondly, this reciprocation will produce a rocking motion with first one side of the tiller leading the other in endeavoring to climb over its forward bank. This rocking motion is most beneficial in effecting the tilling of harder soils and is most pronounced when the cultivator is used in harder ground.

As will also be observed from the drawings, the tines on adjacent mills are preferably set circumferentially between each other, that is, the tines on one mill are approximately 45 degrees out of phase with the tines on the adjacent mill, so that there are 8 power pulses in the tilling action for each revolution of the tiller shaft. More particularly, there are 8 such pulses on each side of the chain, with the pulses on one side occurring simultaneously with the pulses on the other side. Also preferably the tines are set so that the longitudinal thrust produced by the tines on one side of center are equal and opposite to the longitudinal thrust produced by the tines on the opposite side of center. In this connection it will be seen that the tines on the two center mills 6b and 6c are set to balance each other, and similarly the tines on the two outside mills, 6a and 6d, are set to balance each other. In this manner and as will be best seen in Figures 2 and 3, the confronting offset end or hoe portions of the two center mills 6b and 6c are spaced quite close to the opposite sides of the chain case and rotate in unison to thus act as a single hoe or scoop in clearing out the soil underneath the chain case.

Preferably the brake members 7 and 8 are supported by the frame in vertical position behind the mills and in equally spaced relation on opposite sides the chain case 37. As here shown, the brake members 7 and 8 are composed of a pair of rods which are mounted through and adjustably secured in vertically set sockets 121 and 122, of sleeve form, supported in vertical position by a bracket 123 extending out from the rear and under side 124 of the chain case. Bolts 126 threaded into the sockets 121 and 122 serve to rigidly anchor the brake rods 7 and 8 in desired vertical position. Preferably the sockets 121 and 122 position the brake members substantially directly behind but slightly to the outside of the two center mills 6b and 6c. This positioning of the brake members affords a maximum stability and ease of handling of the cultivator. The lower ends 127 of the rods 7 and 8 are preferably bent back in a trailing direction so as to free themselves better from trash and the like which might otherwise become ensnarled around the bottom of the legs. This construction also aids in easy tracking and steering of the cultivator during its forward travel. Where the machine is used in extremely trashy ground, the two brake members may be removed and one replaced in a centrally positioned socket 129.

The provision of different tilling widths is easily made in the present machine by removing one or more of the mill assemblies. For example, by removing the two outside mills 6a and 6d the cultivator is readily adjustable to a 12 inch tilling width. An 18 inch width can be obtained by removing only one of the outside mills 6a or 6d. Where one of the end mills is so removed, the brake member on that side is also removed, leaving the other stand leg disposed approximately behind the center of the three remaining mills. The positioning of the brake rods just slightly to the outside of the two center mills as above described, locates the single brake member in the 3 mill setup mentioned in a position of balance.

To operate the cultivator, the engine is started and permitted to warm up at medium speed. The operator then squeezes the clutch lever 76 to engage the clutch 49 and cause the mills 6 to rotate. The operator then lifts lightly on the handlebar grips 77 and 97 and the cultivator will roll under its own power and under the guidance of the operator to the ground to be tilled. To begin the spading job, the operator rests the stand legs 7 and 8 lightly upon the ground, which causes the tines to penetrate to the depth desired. The stand legs should then be adjusted so that their lower ends 127 will rest upon the bottom of the tilled ground 131. To proceed with the tilling action the operator should rock the cultivator sideways slightly by alternately lifting on the right and left handlebars. This will start the unit moving forwardly in the ground. Thereafter the handlebars are held loosely while tilling and this rocking motion will continue as hereinabove described during further cultivation.

Preferably the speed reducing means used in the transmission of power from the engine to the tiller shaft provides a best working speed for normal tilling action at about one-half throttle. This arrangement not only provides for long engine life but also affords the machine an ample power reserve for handling extreme soil conditions. For average conditions the miller shaft 38 should be operated at about 90 revolutions per minute maximum and will do a very good job all the way down to 30 revolutions per minute. The slower action gently lifts the soil and mixes in the humus in an operation very similar to normal spading. As the engine speed is increased, the faster tine action gives a finer cultivation. Thus by the use of the engine throttle, easily manually controlled by lever 96, the character of cultivation can be controlled from the aforementioned spade-like action to a fine seed bed.

The forward progress of the cultivator and the depth and character of cultivation is also easily and precisely controlled by the amount of pressure applied by the operator on the brake members 7 and 8. Pressing down on the handles retards the forward movement of the machine and causes deeper and repetitive cultivation. In the present design and construction of the mills, it is preferable to till with the tiller shaft at about the surface of the untilled ground. In the machine as illustrated in the accompanying drawings, this provides a normal tilling depth of about 6 inches. The location of the handles generally over the brake members 7 and 8 permits the control of the cultivating action through a straight downward or upward pressure without requiring the operator to push forwardly or to draw back rearwardly on the handles. The operator only needs to press down for a deeper tilling action and a slow forward ground speed and to lift up for producing a shallower tilling action and a faster ground speed. To turn left, the operator lifts the left handle, causing the right set of mills to dig in and thus turn the unit to the left under its own power. Contrariwise, to turn right, the operator only needs to lift the right handlebar.

After a first period of work it may be necessary to tighten the belt adjusting bolt 93 moving the engine forwardly on the rails and tightening the belt and this operation may be repeated from time to time as required to prevent abnormal slippage. However, it will be noted that the provision of the V belts and their ability to slip provides protection for all of the parts of the equipment, should the tines hook or catch something in the ground which stops rotation. The shear bolts 112 also provide added protection in this regard.

I claim:

1. A walking garden cultivator comprising, a frame including a power transmission case, tiller shafts extending horizontally from opposite sides of said case, a plurality of ground tilling mills mounted on each of said shafts and being selectably removable to control the overall width of tillage, a pair of rods supported by said frame in vertical position behind said shafts and in equally spaced relation on opposite sides of said case and engaging the ground at their lower ends to resist forward travel of said mills over the ground to thereby effect tilling action, said mills and rods constituting the sole means of support of said cultivator on the ground, the mounting of said rods providing vertical adjustment thereof to aid in controlling the depth of tilling action and selective removal to balance the action of said mills, and rearwardly disposed handle means for directing said forward travel and for controlling the downward pressure on said rods, each of said mills including a plurality of circumferentially spaced tines each having a flat bladelike portion disposed substantially in the plane of rotation of said mill for cleaving the ground and an outer trailing end portion offset from said plane for tilling the ground adjacent thereto.

2. A walking garden cultivator comprising, a frame including a power transmission case, tiller shafts extending horizontally from opposite sides of said case, a plurality of ground tilling mills mounted on each of said shafts and being selectably removable to control the overall width of tillage, a pair of rods supported by said frame in vertical position behind said shafts and in equally spaced relation on opposite sides of said case and having rearwardly inclined lower end portions adapted for engaging the ground to resist forward travel of said mill over the ground to thereby effect tilling action, said mills and rods constituting the sole means of support of said cultivator on the ground, the mounting of said rods providing vertical adjustment thereof to aid in controlling the depth of tilling action and selective removal to balance the action of said mills, rearwardly disposed handle means for directing said forward travel and for controlling the downward pressure on said rods, each of said mills including a plurality of circumferentially spaced tines each having a flat bladelike portion disposed substantially in the plane of rotation of said mill for cleaving the ground and an outer trailing end portion offset from said plane for tilling the ground adjacent thereto, certain of said tines on both sides of said case being inclined to the plane of rotation so as to produce thrust in an axial direction with the tines on one side of said case opposing the tines on the opposite side of said case and being arranged to cause side to side reciprocation of said tiller during said forward travel.

3. A walking garden cultivator comprising, a frame including an elongated generally vertically set chain case, a driven tiller shaft carried at the lower end of said case and extending horizontally therefrom, a ground tilling mill mounted on said shaft, a drive shaft having a direct single stage chain connection to said tiller shaft and carried at the upper end of said case and extending horizontally therefrom, a gasoline engine mounted on said frame and having a motor driven shaft and a built-in speed reduction transmission ahead of said motor shaft, a sheave mounted on said motor shaft, a second relatively larger sheave mounted for free rotation concentrically with said drive shaft and provided with wheel spokes, a belt entrained on said sheaves, and a manually operated clutch mounted on said drive shaft for rotation therewith and having reciprocating pins advanceable into and retractable out of engagement with said spokes to connect and disconnect said drive shaft to said second sheave thereby permitting in the retracted position of said pins the rolling of said mill on the ground with only said drive shaft connected thereto.

4. A walking garden cultivator comprising, a vertically set power transmission case, a rotary power-driven ground-engaging self-motivated mill carried thereby and including tiller shafts extending horizontally from opposite sides of said case and a plurality of tines mounted on said shafts and extending radially therefrom for engagement with and tilling the earth, each of said tines having a flat blade-like portion disposed in the plane of rotation of said mill and a leading forward cutting edge formed intermediate its length for initial contact with and for cleaving the ground and with a swept back outer end portion formed to enter the ground with progressive slicing action, a rearwardly disposed ground engaging brake member functioning to resist the forward travel of said mill over the ground, said mill and brake member constituting the sole means of support of said cultivator on the ground with a majority of the weight of the cultivator carried by said mill, and rearwardly disposed handle means for directing said forward travel and for controlling the downward pressure on said brake member, the outer end portion of each of said tines being bent perpendicularly from said flat blade-like portion and having a leading edge formed to enter the ground after cleaving by said intermediate portion to provide a follow-up hoe-like action, the tines on opposite sides of said case having transversely aligned and confronting end portions spaced adjacent said case and rotating in unison to jointly remove the soil underneath said case.

References Cited in the file of this patent

UNITED STATES PATENTS

| | | |
|---|---|---|
| 736,279 | Lorenz | Aug. 11, 1903 |
| 930,951 | Fox et al. | Aug. 10, 1909 |
| 961,334 | Barr | June 14, 1910 |
| 1,210,969 | Niedergesaess | Jan. 2, 1917 |
| 1,258,109 | Goeldner | Mar. 5, 1918 |
| 2,082,600 | Squires et al. | June 1, 1937 |
| 2,176,261 | Kelsey | Oct. 17, 1939 |
| 2,503,993 | Blomgren | Apr. 11, 1950 |
| 2,558,822 | Claus | July 3, 1951 |
| 2,614,474 | Merry | Oct. 21, 1952 |
| 2,633,789 | Ober | Apr. 7, 1953 |
| 2,679,200 | Johnson et al. | May 25, 1954 |
| 2,682,823 | Fey | July 6, 1954 |